US011770765B2

(12) United States Patent
Berger et al.

(10) Patent No.: US 11,770,765 B2
(45) Date of Patent: Sep. 26, 2023

(54) RADIO BASE STATION SLEEP MODE-BEACON AND WAKEUP

(71) Applicant: QUALCOMM Incorporated, San Diego, CA (US)

(72) Inventors: Peer Berger, Hod Hasharon (IL); Shay Landis, Hod Hasharon (IL); Assaf Touboul, Netanya (IL); Guy Wolf, Rosh Haayin (IL); David Yunusov, Holon (IL); Michael Levitsky, Rehovot (IL); Sharon Levy, Binyamina (IL); Noam Zach, Kiryat Ono (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/328,936

(22) Filed: May 24, 2021

(65) Prior Publication Data

US 2022/0030515 A1    Jan. 27, 2022

Related U.S. Application Data

(60) Provisional application No. 63/055,082, filed on Jul. 22, 2020.

(51) Int. Cl.
*H04W 52/02*   (2009.01)
*H04L 27/26*   (2006.01)
*H04W 4/40*    (2018.01)
*G04R 20/02*   (2013.01)
*H04W 88/08*   (2009.01)

(52) U.S. Cl.
CPC ..... *H04W 52/0206* (2013.01); *H04L 27/2605* (2013.01); *H04W 4/40* (2018.02); *G04R 20/02* (2013.01); *H04W 88/08* (2013.01)

(58) Field of Classification Search
CPC ............ H04W 52/0206; H04W 76/28; H04W 84/045; H04W 88/08; H04W 24/02; H04W 4/20; H04W 4/40; H04W 40/244; H04W 52/0241; H04W 68/02; H04W 72/0406; H04W 72/0473; H04W 74/004; H04W 74/006; Y02D 30/70; H04L 27/2613
See application file for complete search history.

(56) References Cited

U.S. PATENT DOCUMENTS

2002/0177461 A1* 11/2002 Rosen ...................... H04M 3/42
                                                              455/518
2012/0106423 A1*  5/2012 Nylander .......... H04W 52/0241
                                                              370/311
2013/0329544 A1* 12/2013 Griffioen ........... H04W 52/0206
                                                              370/216

(Continued)

*Primary Examiner* — Awet Haile
(74) *Attorney, Agent, or Firm* — Seyfarth Shaw LLP

(57) ABSTRACT

A method of wireless communications by a user equipment (UE) includes transmitting a wakeup message to awaken a base station from a sleep mode. The method also includes communicating with the base station after the base station awakens. A method of wireless communications by a base station includes entering a sleep mode when no user equipments (UEs) are connected to the base station. The method also includes receiving a signal from a UE to awaken from the sleep mode. The method further includes resuming signal transmissions after waking up from the sleep mode.

10 Claims, 9 Drawing Sheets

(56) References Cited

U.S. PATENT DOCUMENTS

| | | | |
|---|---|---|---|
| 2014/0003312 A1* | 1/2014 | Sergeyev | H04L 5/0055 370/311 |
| 2015/0257095 A1* | 9/2015 | Sun | H04W 52/0206 370/311 |
| 2016/0029407 A1* | 1/2016 | Soldati | H04W 74/006 370/329 |
| 2016/0374018 A1* | 12/2016 | Min | H04L 5/0007 |
| 2017/0048918 A1* | 2/2017 | Iwamura | H04W 24/08 |
| 2019/0098589 A1* | 3/2019 | Chae | H04W 72/048 |
| 2019/0320389 A1* | 10/2019 | Alanen | H04W 72/0446 |
| 2019/0363843 A1* | 11/2019 | Gordaychik | H04W 52/58 |
| 2020/0305073 A1* | 9/2020 | Abouelmaati | H04W 52/0206 |
| 2021/0153120 A1* | 5/2021 | Atungsiri | H04L 27/2636 |

* cited by examiner

RADIO BASE STATION SLEEP MODE-BEACON AND WAKEUP

CROSS-REFERENCE TO RELATED APPLICATION

The present application claims the benefit of U.S. Provisional Patent Application No. 63/055,082, filed on Jul. 22, 2020, and titled "RADIO BASE STATION SLEEP MODE-BEACON AND WAKEUP," the disclosure of which is expressly incorporated by reference in its entirety.

FIELD OF THE DISCLOSURE

Aspects of the present disclosure generally relate to wireless communications, and more particularly to techniques for base stations to sleep and wakeup.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipments (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

A method of wireless communications by a user equipment (UE) includes transmitting a wakeup message to awaken a base station from a sleep mode. The method also includes communicating with the base station after the base station awakens. A method of wireless communications by a base station includes entering a sleep mode when no user equipments (UEs) are connected to the base station. The method also includes receiving a signal from a UE to awaken from the sleep mode. The method further includes resuming signal transmissions after waking up from the sleep mode A method of wireless communications by a user equipment (UE) is described. The method includes receiving a beacon indicating a base station is in a sleep mode. The method also includes transmitting a wakeup message to awaken the base station from the sleep mode in response to receiving the beacon, the wakeup message comprising a wakeup response signal. The method further includes communicating with the base station after the base station awakens.

A method of wireless communications by a base station is described. The method includes entering a sleep mode when no user equipments (UEs) are connected to the base station. The method also includes receiving a signal from a UE to awaken from the sleep mode. The method further includes resuming signal transmissions after waking up from the sleep mode.

Aspects generally include a method, apparatus, system, computer program product, non-transitory computer-readable medium, user equipment, base station, wireless communications device, and processing system as substantially described with reference to and as illustrated by the accompanying drawings and specification.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
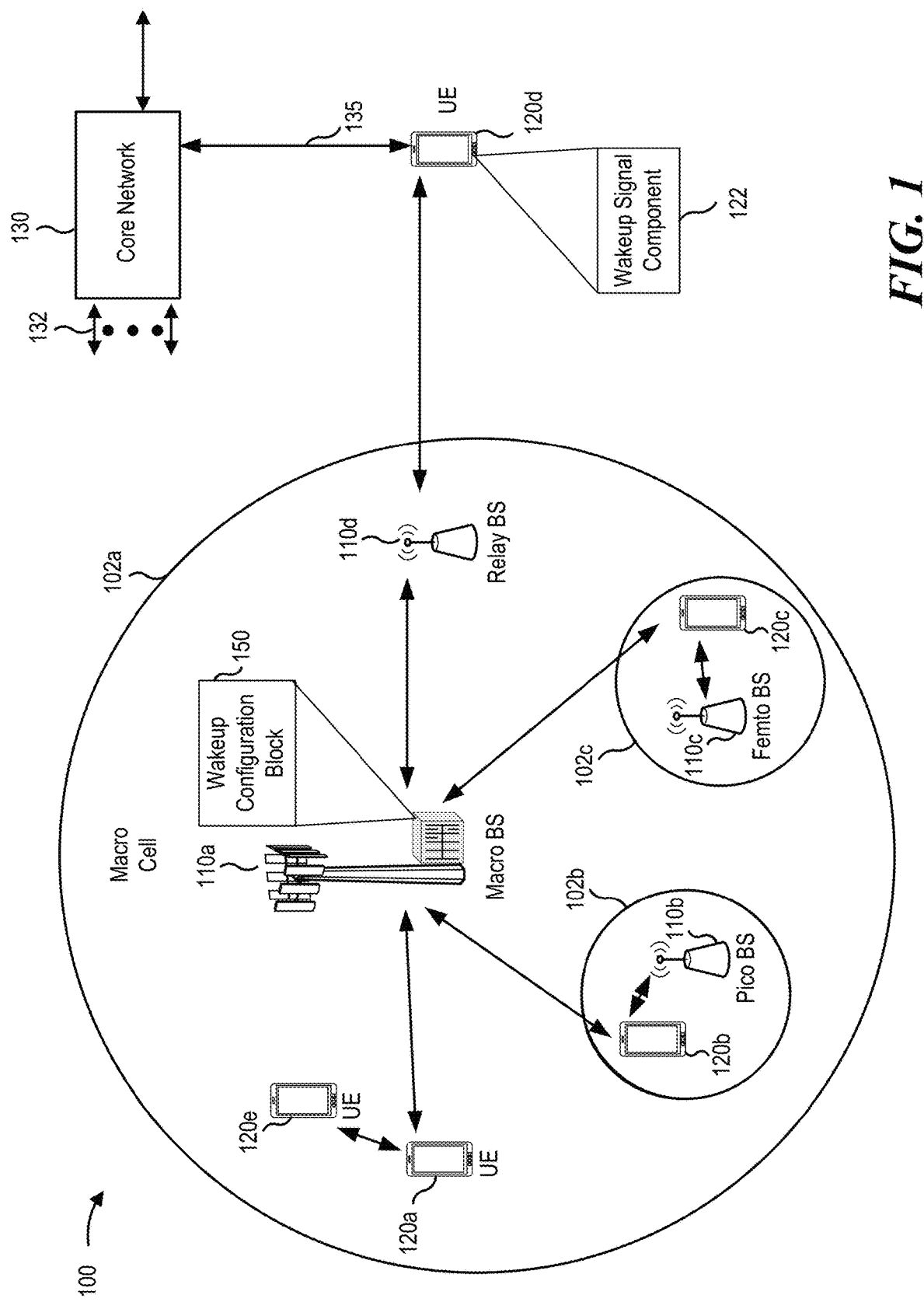
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In operation, a base station may be connected to a number of user equipments (UEs); however, at times, no UEs are connected to a base station. During normal operation, the base station sends broadcast signals/channels regardless of whether there are any UEs connected to the base station. For example, the base station sends broadcast signals/channels (e.g., a primary synchronization signal (PSS) or a secondary synchronization signal (SSS) over a physical broadcast channel (PBCH)) to enable a UE to start a connection negotiation process (e.g., a physical random access channel (PRACH), etc.). In addition, the base station uses downlink channels (e.g., a physical downlink control channel (PDCCH)/physical downlink shared channel (PDSCH)) for communicating a system information block (SIB). The base station continues sending out these broadcast signals/channels with or without a UE connection.

A base station may have access to useful sensor information for enabling a base station sleep mode. For example, if the base station knows that there are no UEs in the current surroundings, the base station may omit transmission of the above-noted broadcast signals/channels. Beneficially, if the base station enters a sleep mode, the base station saves energy. In this example, the sleep mode may be performed per sector of a base station or across all sectors of the base station. In one configuration, the base station has three sectors, such that the base station may sleep one sector at a time.

A previous solution to saving base station power includes a base station transmitting a discovery reference signal (DRS), which contains basic reference signals (e.g., a cell-specific reference signal (CRS), PSS, and/or SSS). These basic reference signals are sparsely transmitted by the base station within a UE DMTC (DRS management timing configuration) enabling cell detection and radio resource management (RRM) measurements by the UE.

A 5G frequency range two (FR2) (e.g., millimeter wave (mmWave)) deployment has a smaller cell range compared to legacy lower frequency bands. Although the smaller cell range creates many challenges from a cellular perspective, a smaller cell geometry of FR2 introduces a great potential for enhancing radio access network (RAN) protocols. For example, one potential enhancement includes incorporating sensor fusion assistance in a radio access system. In some configurations, the sensor fusion is co-located at the base station (e.g., gNB). The base station may be equipped with a set of sensors selected from the following: (1) a camera; (2) radar support; (3) 5G positioning in FR2 (e.g., direction of arrival (DoA) and time of arrival (TOA) beam selection (e.g., DoA+TOA)); and (4) global positioning system (GPS) information from the UE.

In aspects of the present disclosure, the noted sensing is combined with a machine learning algorithm running in a radio access network (RAN) to enhance a family of 5G RAN protocols. These aspects of the present disclosure propose an enhancement for a base station sleep mode aided by base station fusion sensing. In other aspects of the present disclosure, the base station sleep mode relies on transmissions of a beacon signal to notify UEs of a sleeping base station in their vicinity. A UE that detects the beacon signal transmits a wakeup response signal to the base station. In response, the base station exits the sleep mode and resumes regular transmissions for enabling the UE to start a connection negotiation process. In other configurations, the base station omits transmission of the beacon signal during the base station sleep mode. Instead, a receiver of the base station listens for a wakeup signal from a UE in the vicinity of the base station. This receiver may be on a separate power island of the base station to improve power savings of the base station.

FIG. 1 is a diagram illustrating a network 100 in which aspects of the present disclosure may be practiced. The network 100 may be a 5G or new radio (NR) network or some other wireless network, such as an LTE network. The wireless network 100 may include a number of base stations (BSs) 110 (shown as BS 110a, BS 110b, BS 110c, and BS 110d) and other network entities. ABS is an entity that communicates with user equipments (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The network operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S11, S2, etc.) and may perform radio configuration and scheduling for communications with the UEs 120. In some configurations, various functions of each access network entity or BS 110 may be distributed across various network devices (e.g., radio heads and access network controllers) or consolidated into a single network device (e.g., a BS 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smartphone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a power distribution unit (PDU) session for a network slice. In some cases, the UEs 120 may select a network slice based on an application or subscription service. By having different network slices serving different applications or subscriptions, the UEs 120 may improve resource utilization in the wireless network 100, while also satisfying performance specifications of individual applications of the UEs 120. In some cases, the network slices used by UEs 120 may be served by an access management function (AMF) (not shown in FIG. 1) associated with one or both of the BS 110 or core network 130. In addition, session management of the network slices may be performed by a system management function (SMF).

The UEs 120 may include a wakeup signal component 122. For brevity, only one UE 120d is shown as including the wakeup signal component. The wakeup signal component 122 enables an enhancement for a base station sleep mode aided by UE awakening of the base station. The wakeup signal component 122 may be configured to transmit a wakeup message to awaken a base station 110 from a sleep mode and to communicate with the base station 110 after the base station 110 awakens. The wakeup signal component 122 may also be configured to receive a beacon indicating a base station is in a sleep mode. The wakeup signal component 122 may also be configured to transmit a wakeup message to awaken the base station from the sleep mode in response to receiving the beacon. The wakeup message may include a wakeup response signal. The wakeup signal component 122 may also be configured to communicate with the base station after the base station awakens.

The base stations 110 may include a wakeup configuration block 150. For brevity, only one base station 110a is shown as including the wakeup configuration block 150. The wakeup configuration block 150 may be configured to enter a sleep mode when no UEs 120 are connected to the base station 110. The wakeup configuration block 150 may also be configured to receive a signal from the UE 120 to awaken the base station 110 from the sleep mode. The wakeup configuration block 150 may be further configured to and to resume signal transmissions of the base station 110 after waking up the base station from the sleep mode.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet of Things (IoT) devices, and/or may be implemented as narrowband Internet of Things (NB-IoT) devices. Some UEs may be considered customer premises equipment (CPE). UEs 120 may be included inside a housing that houses components of UEs 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, new radio (NR) or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UEs 120 may perform scheduling operations, resource selection operations, and/or other operations described elsewhere as being performed by the BS 110. For example, the BS 110 may configure the UEs 120 via downlink control information (DCI), radio resource control (RRC) signaling, a media access control-control element (MAC-CE), or via system information (e.g., a system information block (SIB)).

As indicated above, FIG. 1 is provided merely as an example. Other examples may differ from what is described with regard to FIG. 1.

Figure 2:
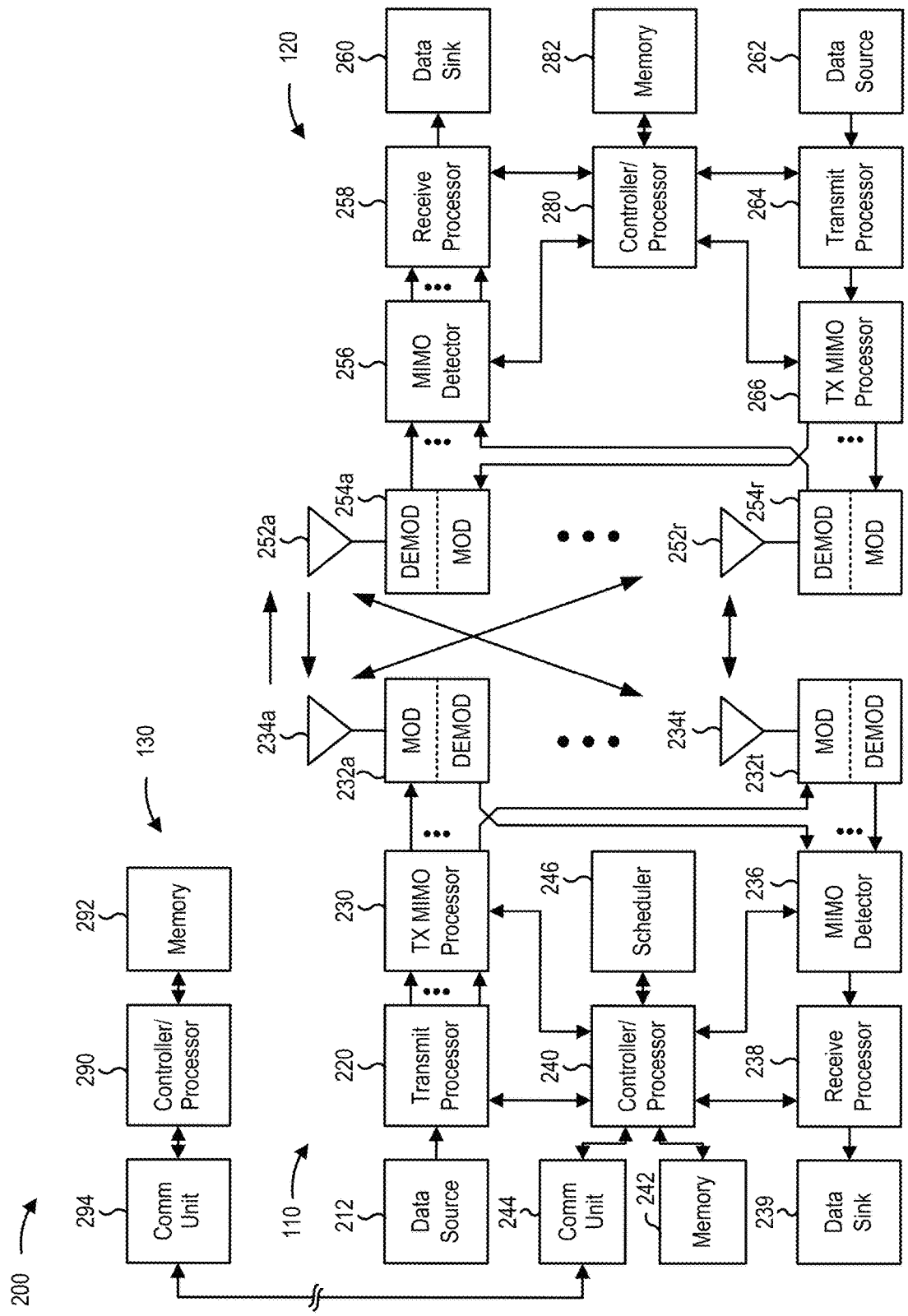
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the BS 110 and UEs 120, which may be one of the BSs and one of the UEs in FIG. 1. The BS 110 may be equipped with T antennas 234a through 234t, and UEs 120 may be equipped with R antennas 252a through 252r, where in general $T \geq 1$ and $R \geq 1$.

At the BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from MODs 232a through 232t may be transmitted via T antennas 234a through 234t, respectively. According to various aspects described in more detail below, the synchronization signals can be generated with location encoding to convey additional information.

At the UEs 120, antennas 252a through 252r may receive the downlink signals from the BS 110 and/or other BSs and may provide received signals to demodulators (DEMODs) 254a through 254r, respectively. Each DEMOD 254 may condition (e.g., filter, amplify, downconvert, and digitize) a received signal to obtain input samples. Each DEMOD 254 may further process the input samples (e.g., for OFDM and/or the like) to obtain received signals. A MIMO detector 256 may obtain received signals from all R DEMODs 254a through 254r, perform MIMO detection on the received signals if applicable, and provide detected symbols. A receive processor 258 may process (e.g., demodulate and decode) the detected symbols, provide decoded data for the UEs 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UEs 120 may be included in a housing.

On the uplink, at the UEs 120, a transmit processor 264 may receive and process data from a data source 262 and control information (e.g., for reports comprising RSRP, RSSI, RSRQ, CQI, and/or the like) from the controller/processor 280. The transmit processor 264 may also generate reference symbols for one or more reference signals. The symbols from the transmit processor 264 may be precoded by a TX MIMO processor 266 if applicable, further processed by DEMODs 254a through 254r (e.g., for DFT-s-OFDM, CP-OFDM, and/or the like), and transmitted to the base station 110. At the BS 110, the uplink signals from the UEs 120 and other UEs may be received by the antennas 234, processed by the DEMODs 254, detected by a MIMO detector 236 if applicable, and further processed by a receive processor 238 to obtain decoded data and control information sent by the UEs 120. The receive processor 238 may provide the decoded data to a data sink 239 and the decoded control information to a controller/processor 240. The BS 110 may include communications unit 244 and communicate to the core network 130 via the communications unit 244. The core network 130 may include a communications unit 294, a controller/processor 290, and a memory 292.

The controller/processor 240 of the BS 110, the controller/processor 280 of the UEs 120, and/or any other component(s) of FIG. 2 may perform one or more techniques associated with 5G new radio (NR) base station sleep and wakeup, as described in more detail elsewhere. For example, the controller/processor 240 of the BS 110, the controller/processor 280 of the UEs 120, and/or any other component(s) of FIG. 2 may perform or direct operations of, for example, the process of FIGS. 7-9 and/or other processes as described. Memories 242 and 282 may store data and program codes for the BS 110 and UEs 120, respectively. A scheduler 246 may schedule UEs for data transmission on the downlink and/or uplink.

In some aspects, the UEs 120 may include means for broadcasting, means for receiving, means for communicating, and/or means for transmitting. In some aspects, the BS 110 may include means for entering, means for receiving, means for transmitting, means for awakening, and/or means for resuming. Such means may include one or more components of the UEs 120 or BS 110 described in connection with FIG. 2.

As indicated above, FIG. 2 is provided merely as an example. Other examples may differ from what is described with regard to FIG. 2.

Figure 3:
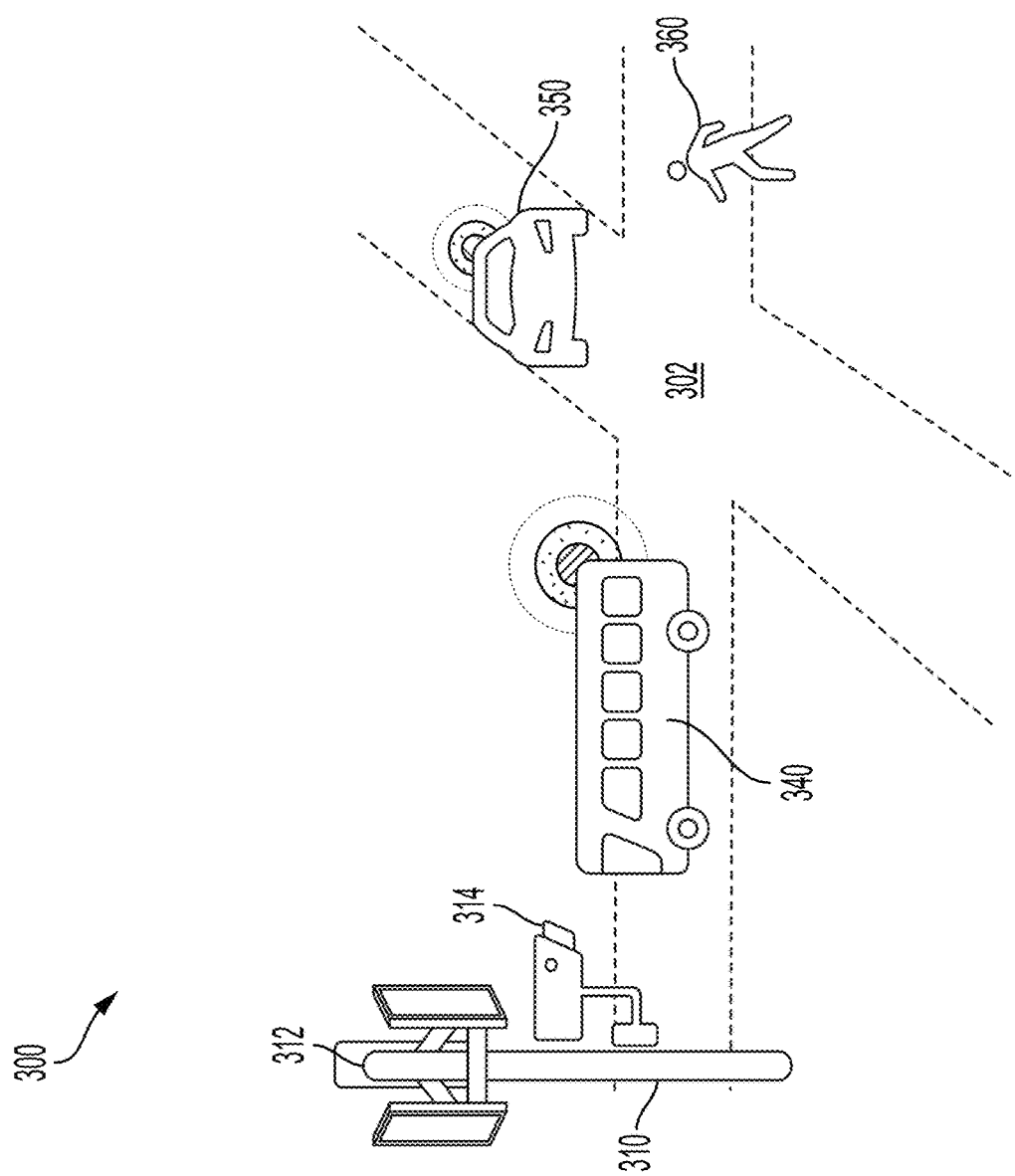
FIG. 3 is a diagram illustrating enhancement of a radio access network (RAN) system using sensor fusion, in accordance with aspects of the present disclosure.

FIG. 3 is a diagram illustrating enhancement of a radio access network (RAN) system 300 using sensor fusion, in accordance with aspects of the present disclosure. In one configuration, a base station 310 is near an intersection 302. The base station 310 includes antennas 312, which cover three sectors, and a sensor 314 (e.g., a camera). In this example, a connected bus 340, a connected vehicle 350, and a pedestrian 360 are shown near the intersection 302. As described, the connected vehicle 350 refers to a vehicle that incorporates a user equipment (UE) to enable communication within the RAN system 300.

The RAN system 300 may be implemented according to a 5G frequency range two (FR2) millimeter wave (mmWave) deployment, having a smaller cell range as well as a smaller cell geometry. The smaller cell geometry enables enhancing of the RAN system 300 by co-locating the sensor 314 (e.g., a camera) at the base station 310. In aspects of the present disclosure, the base station 310 is equipped with a set of sensors, which may be camera support, radar support, 5G positioning in FR2 (e.g., direction of arrival (DoA)+time of arrival (TOA), beam selection), and/or global positioning system (GPS) information from the UE. This sensing may be combined with a machine learning algorithm running in the RAN system 300 to enhance power savings of the RAN system 300. That is, aspects of the present disclosure are directed to an enhancement for a base station sleep mode aided by the sensor 314 (e.g., a camera).

In operation, the base station 310 may be connected to a number of UEs (e.g., within the connected bus 340 and/or the connected vehicle 350); however, at times, no UEs are connected to the base station 310. During normal operation, the base station 310 sends broadcast signals/channels even when there are no connected UEs. For example, the base station 310 sends broadcast signals/channels (e.g., a primary synchronization signal (PSS), a secondary synchronization signal (SSS), physical broadcast channel (PBCH), etc.) to enable a UE (e.g., connected vehicle 350) to start a negotiation process (e.g., a physical random access channel (PRACH), etc.). In addition, the base station 310 uses downlink channels (e.g., physical downlink control channel (PDCCH)/physical downlink shared channel (PDSCH)) for communicating system information, such as a system information block (SIB). The base station 310 continues sending out these broadcast signals/channels without a connection.

In aspects of the present disclosure, the RAN system 300 learns to detect connected vehicles (e.g., connected bus 340/connected vehicle 350) within a proximity of the intersection 302. These aspects of the present disclosure propose an enhancement for a base station sleep mode of the base station 310, in which the sensor 314 may help wake the base station 310. The sensor 314 may be a camera, for example. Although described with reference to the sensor 314, it should be recognized that the base station may be equipped with a set of sensors selected from the following (among others): (1) a camera; (2) radar support; (3) 5G positioning in FR2 (e.g., direction of arrival (DoA) and time of arrival (TOA) beam selection (e.g., DoA+TOA)); and (4) global positioning system (GPS) information from the UE. The base station 310 enters a sleep mode and relies in part on the sensor 314 (e.g., a camera) to wake the base station 310 when UEs are within a vicinity of the base station 310. In response, the base station 310 exits the sleep mode and resumes regular transmissions for enabling the UEs to start a negotiation process. According to further aspects of the present disclosure, the base station sleep mode of the base station 310 is controlled without the aid of a camera, as shown in FIGS. 4-5.

Figure 4:
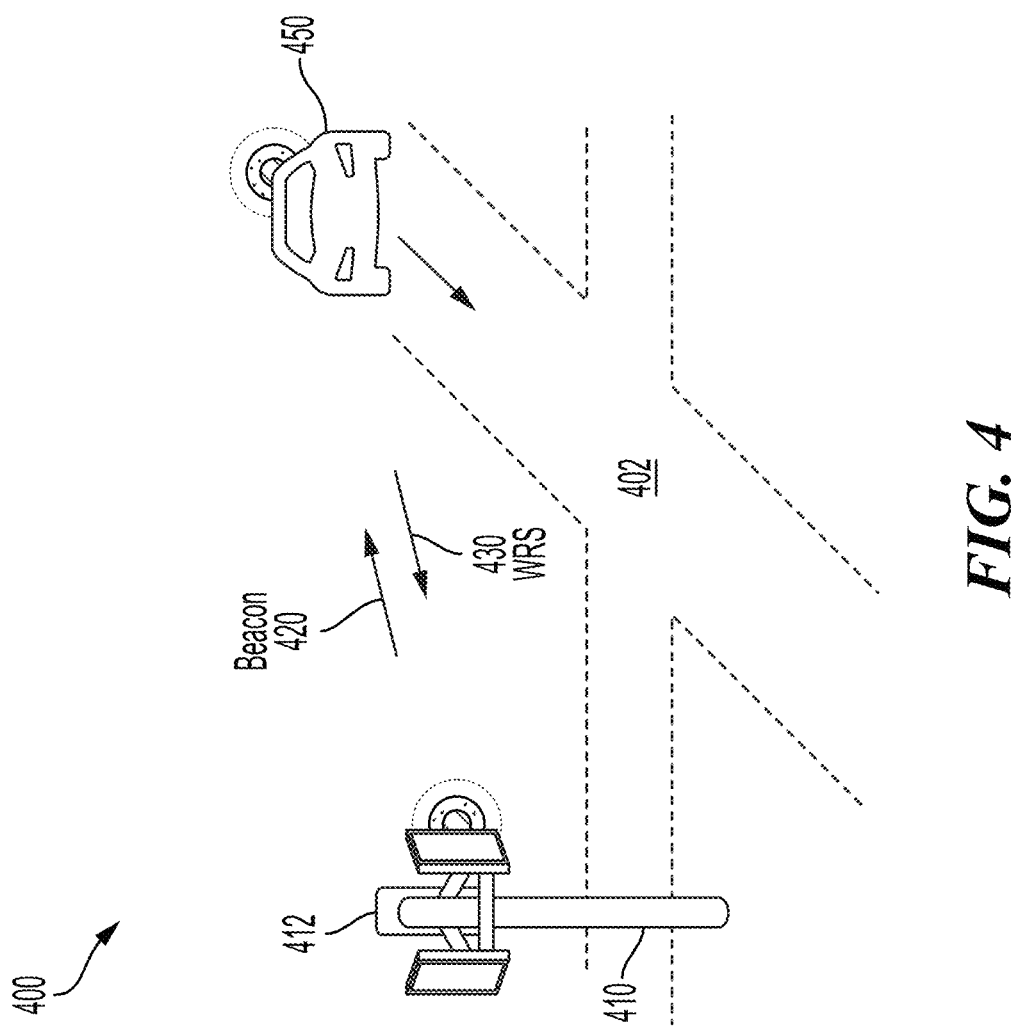
FIG. 4 is a diagram illustrating a base station sleep mode within a radio access network (RAN) system, in accordance with aspects of the present disclosure.
Figure 5:
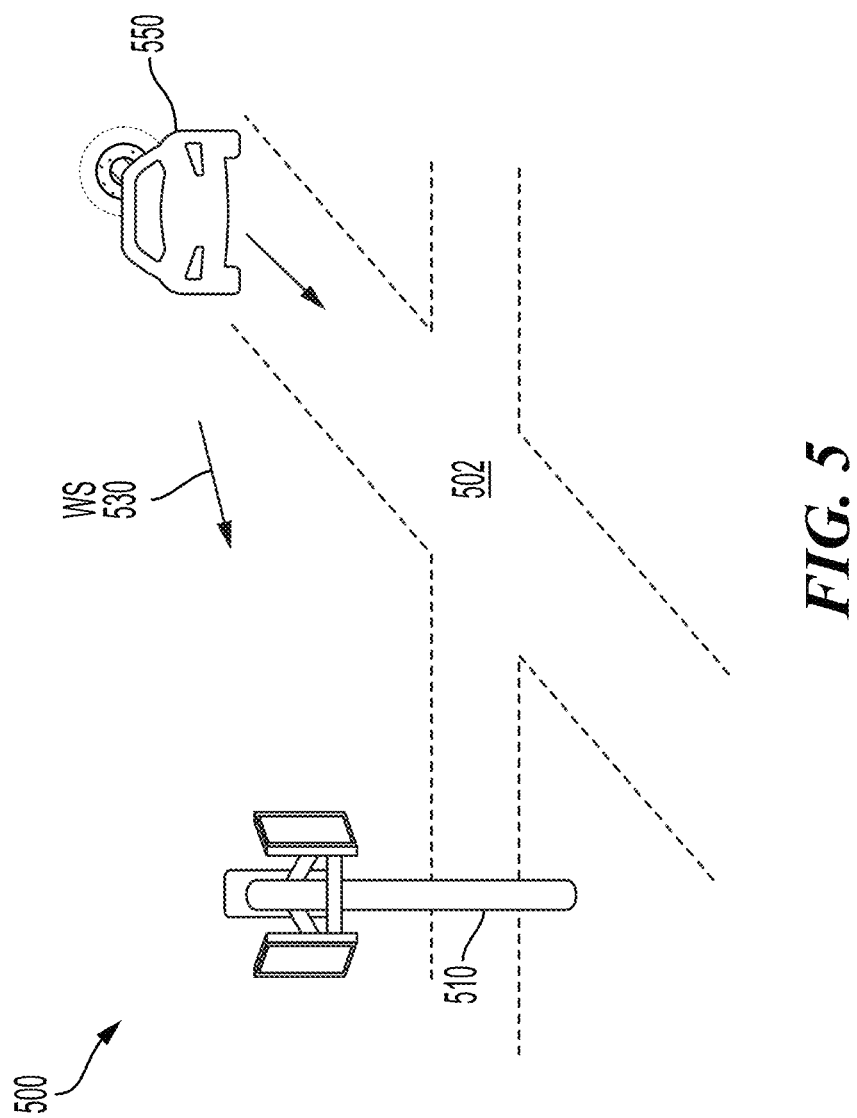
FIG. 5 is a diagram illustrating a base station sleep mode within a radio access network (RAN) system, in accordance with a further aspect of the present disclosure.

FIG. 4 is a diagram illustrating a base station sleep mode within a radio access network (RAN) system 400, in accordance with aspects of the present disclosure. In this configuration, a base station 410 is near an intersection 402. The base station 410 includes antennas 412, which cover three sectors. In this example, a connected car 450 is shown near the intersection 402. In the base station sleep mode of these aspects of the present disclosure, when there are no UEs (e.g., connected car 450) connected to the base station 410, the base station 410 enters a sleep mode. The sleep mode may be performed per sector of the base station 410.

In these aspects of the present disclosure, while in the sleep mode, the base station 410 sends a beacon signal 420 to notify UEs within the vicinity that there is a sleeping base station in their surrounding area. In this example, a receiver of the connected car 450 listens for the beacon signal 420. The beacon signal 420 may be lighter than a discovery reference signal (DRS). For example, the beacon signal 420 may be implemented using a predefined fixed signal with good autocorrelation characteristics. The predefined fixed signal may be transmitted on a predefined frequency. The beacon signal 420 may be implemented using a predefined timing, up to a particular uncertainty, based on the GPS of the connected car 450. For example, the beacon may be transmitted at some time offset based on a GPS signal.

In aspects of the present disclosure, the beacon signal 420 is transmitted across all beams. Transmission of the beacon signal 420 over the different beams may be performed sequentially, simultaneously, or in beam groups. Simultaneous beams save time while sequential beams might have a better link budget because power is divided between beams.

In some configurations, a UE of the connected car 450 receives the beacon signal 420 and responds with a wakeup response signal (WRS) 430, which may be predefined. Similar to the beacon signal 420, the wakeup response signal 430 may be a predefined fixed signal with good autocorrelation characteristics, transmitted on a predefined frequency. The wakeup response signal 430 may also have a predefined timing relative to the beacon signal 420 so the base station 410 knows when to listen for the wakeup response signal 430. The wakeup response signal 430 may be transmitted through all the beams of the UE of the connected car 450 for enough time so that the base station 410 is able to monitor all of its beams.

In this example, the base station 410 listens for the wakeup response signal 430 in a specific predefined time and frequency. In some aspects of the present disclosure, a receiver (not shown) of the base station 410 may be simple and efficient, for example, based on a correlation/energy detector that may be implemented on a separate power island, enabling further power savings during the sleep mode. Once the base station 410 receives the wakeup response signal 430, the base station 410 resumes communication with regular signal transmissions (e.g., PSS, SSS, PBCH, etc.).

In some configurations, the wakeup response signal 430 is implemented using a small set of orthogonal signals for supporting multiple, simultaneous UE responses to the beacon signal 420. Because a number of UEs sending the wakeup response signal 430 is likely very small (e.g., usually a single UE), another option is to use a set of signals, such as a set of cyclic shifts (e.g., instead of orthogonal signals) for implementing the wakeup response signal 430.

FIG. 5 is a diagram illustrating a base station sleep mode within a radio access network (RAN) system 500, in accordance with further aspects of the present disclosure. In this example, a base station 510 is near an intersection 502. In this example, a connected vehicle 550 is shown near the intersection 502. In the base station sleep mode of these aspects of the present disclosure, when there are no UEs (e.g., the connected vehicle 550) connected to the base station 510, the base station 510 enters a sleep mode. The sleep mode may be per sector.

In these aspects of the present disclosure, during the sleep mode, the base station 510 discontinues signal transmission, but maintains a receiver in an active mode to listen for a predefined wakeup signal (WS) 530 from the connected vehicle 550. As described, this sleep mode of the base station 510 is referred to as a "receive only mode," which provides improved power efficiency relative to the sleep mode shown in FIG. 4. The receiver (not shown) of the base station 510 may be configured as a correlation/energy detector that may be implemented on a separate power island of the base station 510.

According to these aspects of the present disclosure, the connected vehicle 550 can search for sleeping base stations by sending the WS 530. In some configurations, the WS 530 is a predefined fixed signal with good autocorrelation characteristics. In addition, the WS 530 is transmitted on a predefined frequency. The WS 530 may also be transmitted with a predefined timing (e.g., possibly using a predefined timing, up to a particular uncertainty, based on the GPS of the connected vehicle). For example, predefined timing may be determined based on a global positioning system (GPS) signal. In this example, the WS 530 is transmitted through all beams of the connected vehicle 550 with enough time to enable the base station 510 to receive across all of its beams. The base station 510 listens for the WS 530 in a specific time and frequency. When the base station 510 receives the WS 530, the base station 510 resumes regular signal transmissions (e.g., PSS, SSS, PBCH, etc.) to enable a connection negotiation procedure with the connected vehicle 550.

In some configurations, the WS 530 is composed of a small set of orthogonal signals for situations in which multiple connected vehicles search for a sleeping base station. Because the number of UEs (e.g., the connected vehicle 550) is likely very small (usually a single UE), another option is to use a set of cyclic shifts (e.g., different cyclic shifts instead of orthogonal signals) to implement the WS 530.

Figure 6:
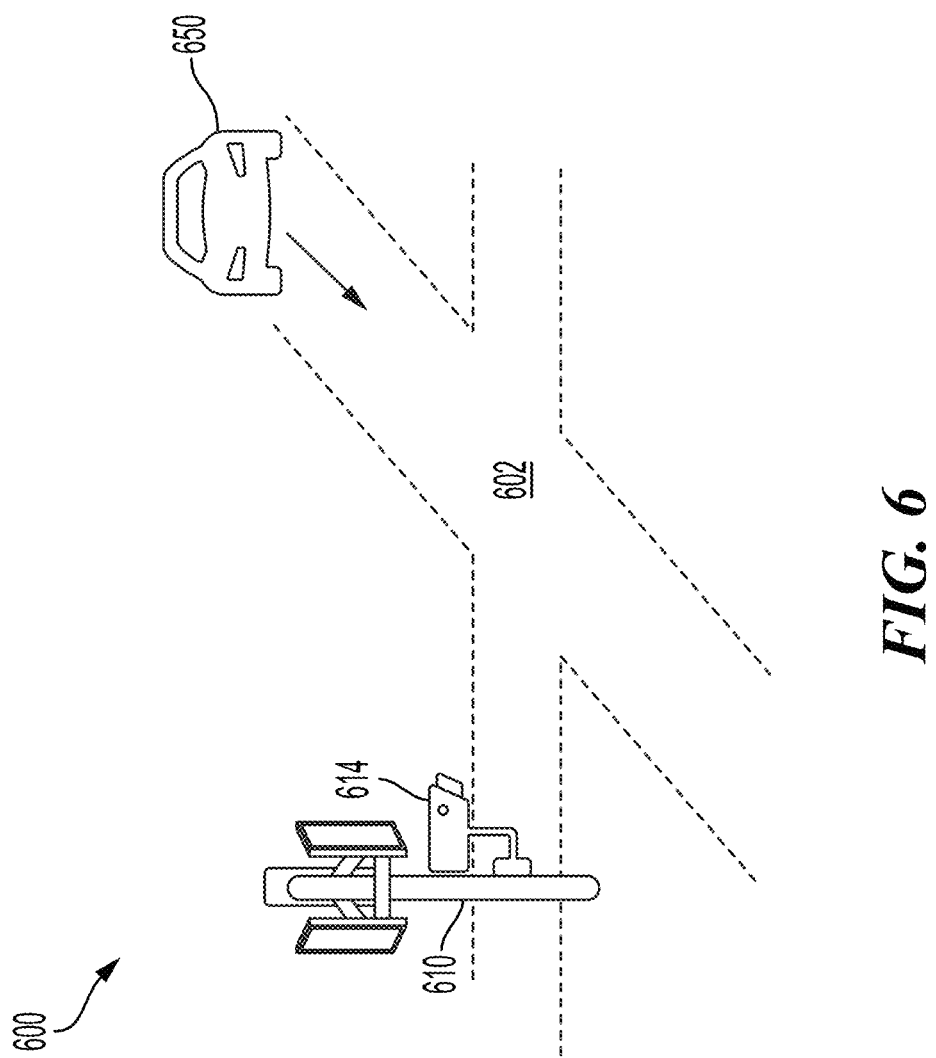
FIG. 6 is a diagram illustrating enhancement of a radio access network (RAN) using a sensor, in accordance with aspects of the present disclosure.

FIG. 6 is a diagram illustrating enhancement of a radio access network (RAN) system 600 using a sensor, in accordance with aspects of the present disclosure. In the example of FIG. 6, a base station 610 is near an intersection 602. In this example, a connected vehicle 650 is shown near the intersection 602. According to these aspects of the present disclosure, the base station 610 decides when to sleep or wake up based on fusion sensor support. For example, the base station 610 receives mobility and direction information of the connected vehicle 650 from the sensor 614 (e.g., camera), which triggers a wakeup. These sensor aspects of the present disclosure may be combined with the base station sleep mode configurations described in FIGS. 4 and 5.

Aspects of the present disclosure are directed to a base station sleep mode for saving energy of a base station, such as a gNB. Some of the distinctions of introducing the base station sleep mode include the new beacon signal that the base station transmits while in sleep mode. There is also the new wakeup response signal (WRS) that the UE sends as a response to the beacon signal for waking up the sleeping base station. According to other aspects, there is the new wakeup signal (WS) that the connected vehicle broadcasts (e.g., a broadcast message) for waking up a sleeping base station. These techniques reduce base station power consumption and may be combined with sensor fusion techniques.

As indicated above, FIGS. 3-6 are provided as examples. Other examples may differ from what is described with respect to FIGS. 3-5.

Figure 7:
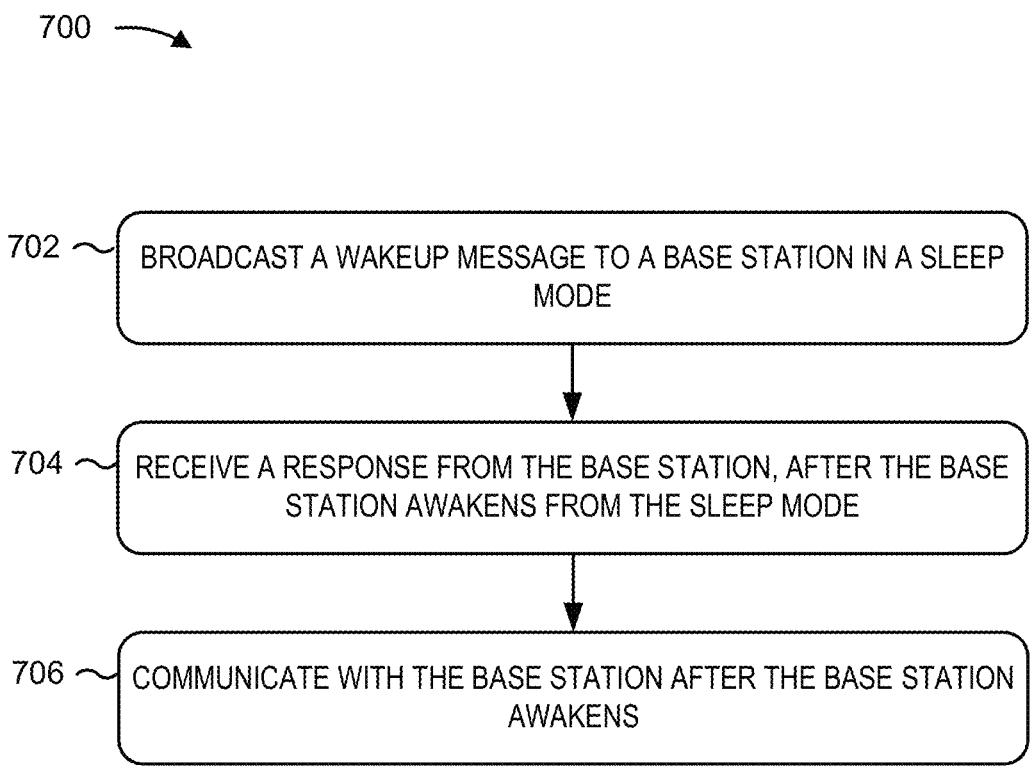
FIG. 7 is a flow diagram illustrating an example process performed by a user equipment (UE), in accordance with various aspects of the present disclosure.

FIG. 7 is a flow diagram illustrating an example process 700, such as a method of wireless communication performed, for example, by a UE, in accordance with various aspects of the present disclosure. The example process 700 is an example of an enhancement for a new radio (NR) base station sleep mode.

As shown in FIG. 7, in some aspects, the process 700 includes broadcasting a wakeup message to a base station in a sleep mode (block 702). For example, the UE (e.g., using the antenna 252, the MOD/DEMOD 254, the TX MIMO processor 266, the TX processor 264, the controller/processor 280, and/or the memory 282) can broadcast the wakeup message to the base station in the sleep mode. For example, as shown in FIG. 5, the connected vehicle 550 can search for sleeping base stations by sending the WS 530. In some configurations, the WS 530 is a predefined fixed signal with good autocorrelation characteristics. In addition, the WS 530 is transmitted on a predefined frequency. The WS 530 may also be transmitted with a predefined timing (e.g., possibly using a predefined timing, up to a particular uncertainty, based on the GPS of the connected vehicle). For example, predefined timing may be determined based on a global positioning system (GPS) signal.

In some aspects, the process 700 also includes receiving a response from the base station, after the base station awakens from the sleep mode (block 704). For example, the UE (e.g., using the antenna 252, DEMOD/MOD 254, the MIMO detector 256, the RX processor 258, controller/processor 280, and/or memory 282) can receive the response from the base station after the base station awakens. For example, as shown in FIG. 5, the base station 510 discontinues signal transmission, but maintains a receiver in an active mode to listen for the WS 530 from the connected vehicle 550. As described, this sleep mode of the base station 510 is referred to as a "receive only mode," which provides improved power efficiency relative to the sleep mode shown in FIG. 4. The receiver (not shown) of the base station 510 may be configured as a correlation/energy detector that may be implemented on a separate power island of the base station 510.

In some aspects, the process 700 also includes communicating with the base station after the base station awakens (block 706). For example, the UE (e.g., using the antenna 252, DEMOD/MOD 254, MIMO detector 256, RX processor 258, TX MIMO processor 266, TX processor 264, controller/processor 280, and/or memory 282) can communicate with the base station after the base station awakens. For example, as shown in FIG. 5, the base station 510 listens for the WS 530 in a specific time and frequency. When the base station 510 receives the WS 530, the base station 510 resumes regular signal transmissions (e.g., PSS, SSS, PBCH, etc.) to enable a connection negotiation procedure with the connected vehicle 550.

Figure 8:
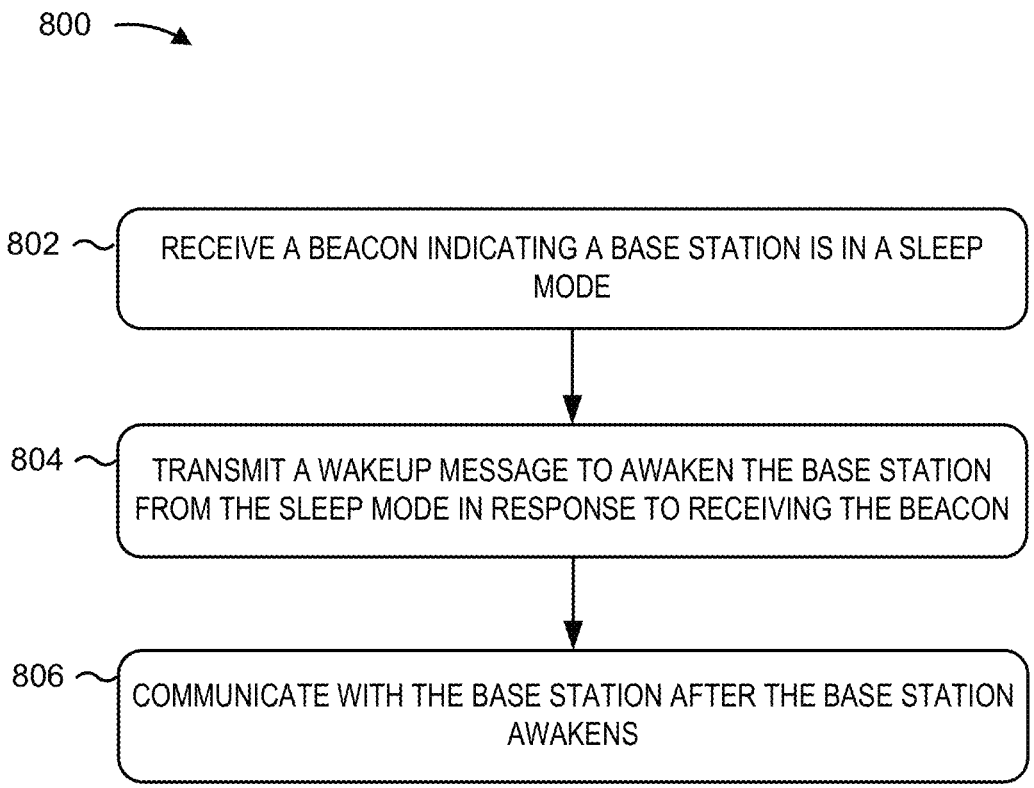
FIG. 8 is a flow diagram illustrating an example process performed by a user equipment (UE), in accordance with various aspects of the present disclosure.

FIG. 8 is a flow diagram illustrating an example process 800 performed, for example, by a UE, in accordance with various aspects of the present disclosure. The example process 800 is an example of an enhancement for a new radio (NR) base station sleep mode.

As shown in FIG. 8, in some aspects, the process 800 includes receiving a beacon indicating a base station is in a sleep mode (block 802). For example, the UE (e.g., using the antenna 252, MOD/DEMOD 254, the MIMO detector 256, the RX processor 258, the controller/processor 280, and/or the memory 282) can receive the beacon indicating the base station is in the sleep mode. For example, as shown in FIG. 4, a receiver of the connected car 450 listens for the beacon signal 420. The beacon signal 420 may be lighter than a discovery reference signal (DRS). For example, the beacon signal 420 may be implemented using a predefined fixed signal with good autocorrelation characteristics. The predefined fixed signal may be transmitted on a predefined frequency. The beacon signal 420 may be implemented using a predefined timing, up to a particular uncertainty, based on the GPS of the connected car 450.

In some aspects, the process 800 also includes transmitting a wakeup message to awaken the base station from the sleep mode in response to receiving the beacon (block 804). For example, the UE (e.g., using the antenna 252, MOD/DEMOD 254, TX MIMO processor 266, TX processor 264, controller/processor 280, and/or memory 282) can transmit the wakeup message to awaken the base station from the sleep mode in response to receiving the beacon. For example, as shown in FIG. 4, the UE of the connected car 450 receives the beacon signal 420 and responds with a wakeup response signal (WRS) 430, which may be predefined. Similar to the beacon signal 420, the wakeup response signal 430 may be a predefined fixed signal with good autocorrelation characteristics, transmitted on a predefined frequency. The wakeup response signal 430 may also have a predefined timing relative to the beacon signal 420 so the base station 410 knows when to listen for the wakeup response signal 430. The wakeup response signal 430 may be transmitted through all the beams of the UE of the connected car 450 for enough time so that the base station 410 is able to monitor all of its beams.

In some aspects, the process 800 also includes communicating with the base station after the base station awakens (block 806). For example, the UE (e.g., using the antenna 252, DEMOD/MOD 254, MIMO detector 256, RX processor 258, TX MIMO processor 266, TX processor 264, controller/processor 280, and/or memory 282) can communicate with the base station after the base station awakens. For example, as shown in FIG. 4, once the base station 410 receives the wakeup response signal 430, the base station 410 resumes communication with the connected car 450 using regular signal transmissions (e.g., PSS, SSS, PBCH, etc.).

Figure 9:
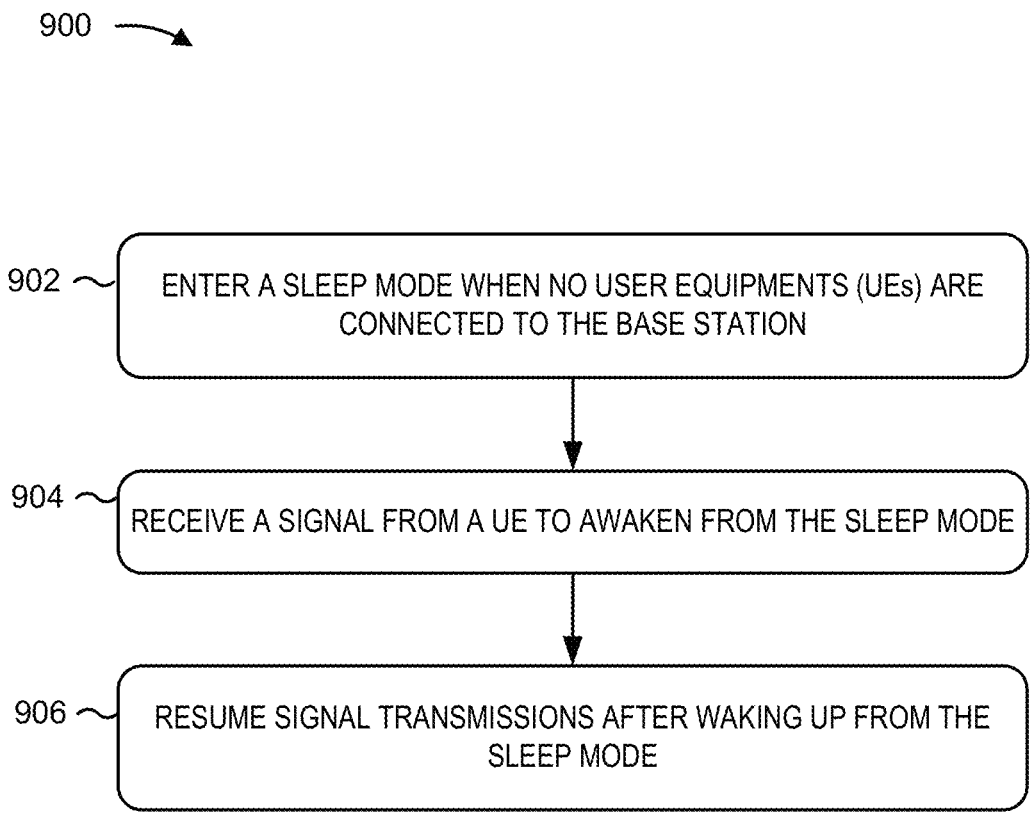
FIG. 9 is a flow diagram illustrating an example process performed by a base station, in accordance with various aspects of the present disclosure.

FIG. 9 is a flow diagram illustrating an example process 900 performed, for example, by a base station, in accordance with various aspects of the present disclosure. The example process 900 is an example of an enhancement for a new radio (NR) base station sleep mode.

As shown in FIG. 9, in some aspects, the process 900 includes entering a sleep mode when no user equipments (UEs) are connected to the base station (block 902). For example, the base station (e.g., using the antenna 234, DEMOD/MOD 232, MIMO detector 236, RX processor 238, controller/processor 240, and/or memory 242) can determine no UEs are connected and trigger the base station to enter the sleep mode. For example, as shown in FIG. 5, in the base station sleep mode of these aspects of the present disclosure, when there are no UEs (e.g., the connected vehicle 550) connected to the base station 510, the base station 510 enters a sleep mode. The sleep mode may be per sector.

In some aspects, the process 900 also includes receiving a signal from a UE to awaken from the sleep mode (block 904). For example, the base station (e.g., using the antenna 234, DEMOD/MOD 232, MIMO detector 236, RX processor 238, controller/processor 240, and/or memory 242) can receive the signal from a UE to awaken from the sleep mode. For example, as shown in FIG. 5, during the sleep mode, the base station 510 discontinues signal transmission, but maintains a receiver in an active mode to listen for a predefined wakeup signal (WS) 530 from the connected vehicle 550. As described, this sleep mode of the base station 510 is referred to as a "receive only mode," which provides improved power efficiency relative to the sleep mode shown in FIG. 4. The receiver (not shown) of the base station 510 may be configured as a correlation/energy detector that may be implemented on a separate power island of the base station 510.

In some aspects, the process 900 further includes resuming signal transmissions after waking up from the sleep mode (block 906). For example, the base station (e.g., using the antenna 234, MOD/DEMOD 232, TX MIMO processor 230, TX processor 220, controller/processor 240, communications unit 244, and/or memory 242) can resume signal transmissions with the UE after waking up from the sleep mode. For example, as shown in FIG. 5, the base station 510 listens for the WS 530 in a specific time and frequency. When the base station 510 receives the WS 530, the base station 510 resumes regular signal transmissions (e.g., PSS, SSS, PBCH, etc.) to enable a connection negotiation procedure with the connected vehicle 550.

Implementation examples are provided in the following numbered clauses:

1. A method of wireless communication by a user equipment (UE), comprising:
broadcasting a wakeup message to a base station in a sleep mode;
receiving a response from the base station, after the base station awakens from the sleep mode; and
communicating with the base station after the base station awakens.

2. The method of clause 1, further comprising broadcasting the wakeup message on a predefined frequency.

3. The method of clause 1, in which the wakeup message comprises a predefined fixed wakeup signal.

4. The method of clause 3, further comprising transmitting the predefined fixed wakeup signal through all beams of the UE.

5. The method of clause 3, further comprising transmitting the predefined fixed wakeup signal with a predefined timing.

6. The method of clause 5, in which the predefined timing is determined based on a global positioning system (GPS) signal.

7. The method of clause 1, in which the wakeup message comprises a set of signals.

8. The method of clause 7, in which the set of signals comprises orthogonal signals.

9. The method of clause 7, in which the set of signals comprises signals with different cyclic shifts.

10. A method of wireless communications by a user equipment (UE), comprising:
receiving a beacon indicating a base station is in a sleep mode;
transmitting a wakeup message to awaken the base station from the sleep mode in response to receiving the beacon, the wakeup message comprising a wakeup response signal; and
communicating with the base station after the base station awakens.

11. The method of clause 10, in which the transmitting the wakeup message comprises transmitting the wakeup response signal on a predefined frequency.

12. The method of clause 10, in which the wakeup response signal comprises a predefined fixed wakeup response signal.

13. The method of clause 12, further comprising transmitting the predefined fixed wakeup response signal through all beams of the UE.

14. The method of clause 12, further comprising transmitting the predefined fixed wakeup response signal with a predefined timing.

15. The method of clause 10, further comprising receiving the beacon at a predefined frequency.

16. The method of clause 15, further comprising receiving the beacon with a predefined timing.

17. The method of clause 10, in which the wakeup response signal comprises a set of signals.

18. The method of clause 17, in which the set of signals comprises orthogonal signals.

19. The method of clause 17, in which the set of signals comprises signals with different cyclic shifts.

20. A method of wireless communications by a base station, comprising:
entering a sleep mode when no user equipments (UEs) are connected to the base station;
receiving a signal from a UE to awaken from the sleep mode; and
resuming signal transmissions after waking up from the sleep mode.

21. The method of clause 20, in which the sleep mode is per sector of the base station.

22. The method of clause 20, further comprising transmitting a predefined fixed beacon, while in the sleep mode, to notify UEs of the base station in the sleep mode.

23. The method of clause 22, in which transmitting the beacon occurs through all beams sequentially, simultaneously, or in beam groups.

24. The method of clause 22, in which transmitting the predefined fixed beacon occurs on a predefined frequency.

25. The method of clause 24, further comprising transmitting the predefined fixed beacon with a predefined timing.

26. The method of clause 22, in which the signal to awaken comprises a wakeup response signal, the base station listening for the wakeup response signal at a predefined frequency and a predefined time relative to the beacon.

27. The method of clause 20, in which the signal to awaken comprises a wakeup signal, the base station listening for the wakeup response signal at a predefined frequency and a predefined time.

28. The method of clause 20, further comprising awakening from the sleep mode in response to sensor information generated at the base station, in which the sensor information indicates mobility information and directional information of the UE.

29. The method of clause 20, in which the receiving comprises listening, by a receiver on a separate power island of the base station, for a wakeup response signal.

30. The method of clause 20, in which the resuming signal transmissions comprises transmitting a broadcast message from the base station to a vehicle after the base station awakens.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

Although the present disclosure and its advantages have been described in detail, it should be understood that various changes, substitutions, and alterations can be made without departing from the technology of the present disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

What is claimed is:

1. A method of wireless communications by a base station, comprising:
    entering a sleep mode when no user equipments (UEs) are connected to the base station;
    receiving a signal from a UE to awaken from the sleep mode;
    awakening from the sleep mode in response to the signal and sensor information generated at the base station, the sensor information indicating mobility information and directional information of the UE; and
    resuming signal transmissions after waking up from the sleep mode.

2. The method of claim 1, in which the sleep mode is per sector of the base station.

3. The method of claim 1, further comprising transmitting a predefined fixed beacon, while in the sleep mode, to notify UEs of the base station in the sleep mode.

4. The method of claim 3, in which transmitting the beacon occurs through all beams sequentially, simultaneously, or in beam groups.

5. The method of claim 3, in which transmitting the predefined fixed beacon occurs on a predefined frequency.

6. The method of claim 5, further comprising transmitting the predefined fixed beacon with a predefined timing.

7. The method of claim 3, in which the signal to awaken comprises a wakeup response signal, the base station listening for the wakeup response signal at a predefined frequency and a predefined time relative to the beacon.

8. The method of claim 1, in which the signal to awaken comprises a wakeup signal, the base station listening for the wakeup response signal at a predefined frequency and a predefined time.

9. The method of claim 1, in which the receiving comprises listening, by a receiver on a separate power island of the base station, for a wakeup response signal.

10. The method of claim 1, in which the resuming signal transmissions comprises transmitting a broadcast message from the base station to a vehicle after the base station awakens.

* * * * *